DENTON, SHANNON & LUCAS.
Grain Separator.
No. 85,801.
Patented Jan'y 12, 1869.
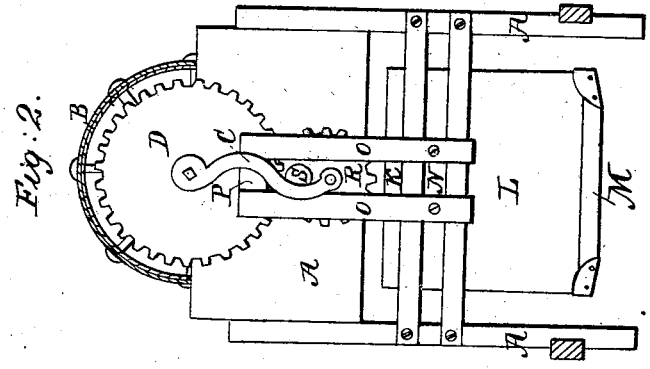
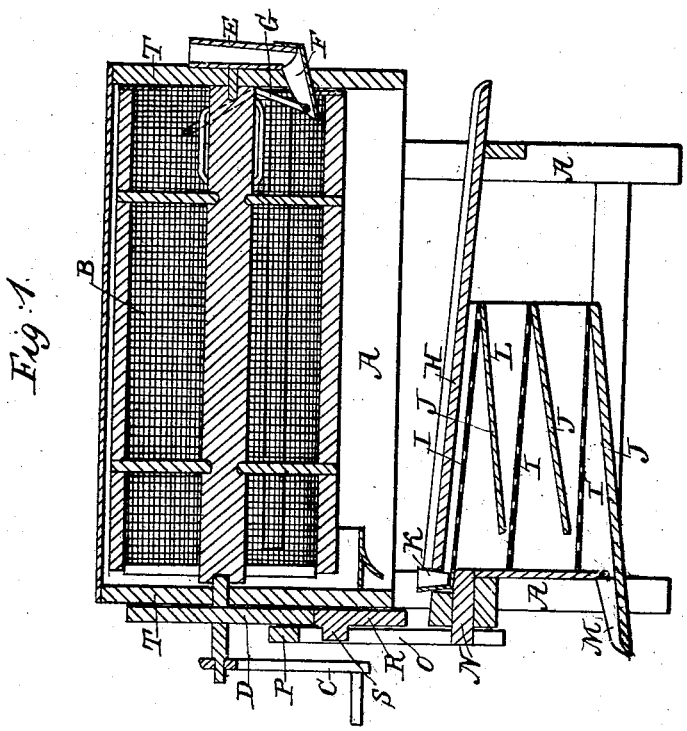
Witnesses;
Inventors.

JAMES A. DENTON, DAVID W. SHANNON, AND ELIJAH LUCAS, OF WINSLOW, INDIANA.

Letters Patent No. 85,801, dated January 12, 1869.

IMPROVEMENT IN GRAIN-SEPARATOR.

The Schedule referred to in these Letters Patent and making part of the same.

*To all whom it may concern:*

Be it known that we, JAMES A. DENTON, DAVID W. SHANNON, and ELIJAH LUCAS, of Winslow, in the county of Pike, and in the State of Indiana, have invented a certain new and useful Improvement in Grain-Separator; and do hereby declare that the following is a full, clear, and exact description thereof, reference being had to the accompanying drawings, and to the letters of reference marked thereon.

The nature of our invention consists in the arrangement of the hopper, and in a series of screens placed under the cheat-board, whereby a complete separation of oats from spring-wheat is obtained.

In order to enable others skilled in the art to which our invention appertains, to make and use the same, we will now proceed to describe its construction and operation, referring to the annexed drawings, which form a part of this specification, and in which—

Figure 1 is a side elevation in section, and
Figure 2, an end view.

A A represent a frame, of suitable dimensions, in the ends of which the shaft for the drum B has its bearings, said shaft being turned by a crank, C, and on this shaft, outside of the frame A, is placed a cog-wheel, D, the use of which will be hereinafter set forth.

The hopper E, through which the grain is fed to the drum B, is so placed, on the end of the frame A, that the spout F, which carries the grain forward, enters the drum below its centre. By this arrangement, the grain is much easier fed than in such separators where the grain enters the drum above the centre, near the upper edge.

The spout F is pivoted to the lower end of the hopper E, and suspended by a hoop or ring, G, around the shaft of the drum, which at that point is provided with small pieces of wire, so as to impart a vibrating motion to the spout when the drum is revolved.

Under the cheat-board H is placed a series of screens, I I and boards J J, and any grain to be separated, failing to pass off the cheat-board, is received on the first fall through the hopper K, as shown in fig. 1, and failing to pass off that, is received on the second, and then on the third, making a complete separation.

This separation is obtained by the grain passing over the screens I I, which consist of tin sheets, perforated to a certain size, the wheat passing through, and the oats passing over.

The screens I I and boards J J are enclosed in a casing or box, L, open in one end, and provided at the other with a spout, M, through which the separated grain is at last carried off.

The box or casing L is provided with a bar, N, across one end, which extends through the end of the frame A. To this bar N, outside of the frame A, are secured two upright bars, O O, which are connected at the top by a cross-bar, P, thus forming a frame along the end of the frame A.

On this end of the frame A is placed a pinion, R, which gears into the cog-wheel D, already described as being placed on the shaft of the drum B. This pinion is provided, on the outer side, near its periphery, with a lug or pin, S, which fits in between the bars O O, so that when the separator is in operation, the box L, with the screens, boards, and cheat-board, will obtain a reciprocating motion from one side to the other, the cheat-board H forming the top of the box L.

When the machine is in operation, a cover or lid, T, is placed over the drum B, which cover rests on the top of the frame A.

Having thus fully described our invention,

What we claim as new, and desire to secure by Letters Patent, is—

1. The arrangement of the cheat-board H and box L with the screens I I and fall-boards J J, all constructed and operating substantially as herein shown and described.

2. The arrangement of the cog-wheel D and pinion R, with its lug S, in combination with the bars O O, arranged as described, for the purpose of imparting a reciprocating motion to the casing L, substantially as herein set forth.

In testimony that we claim the foregoing, we have hereunto set our hands, this 29th day of August, 1868.

JAMES A. DENTON.
DAVID W. SHANNON.
ELIJAH LUCAS.

Witnesses:
GEORGE BEE,
HIRAM W. TIDMAN.